(12) United States Patent
Leech

(10) Patent No.: US 10,478,700 B2
(45) Date of Patent: *Nov. 19, 2019

(54) GOLF SWING ANALYSIS FROM PRE-STRIKE SOUND

(71) Applicant: NIKE, Inc., Beaverton, OR (US)

(72) Inventor: Nicholas A. Leech, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,869

(22) Filed: Aug. 8, 2018

(65) Prior Publication Data

US 2018/0345110 A1 Dec. 6, 2018

Related U.S. Application Data

(63) Continuation of application No. 14/985,846, filed on Dec. 31, 2015, now Pat. No. 10,080,947.

(51) Int. Cl.
| | |
|---|---|
| *A63B 69/36* | (2006.01) |
| *G01L 1/25* | (2006.01) |
| *G06K 9/00* | (2006.01) |
| G06F 1/16 | (2006.01) |
| A63B 71/06 | (2006.01) |
| A63B 60/42 | (2015.01) |

(52) U.S. Cl.
CPC ............. *A63B 69/36* (2013.01); *G01L 1/255* (2013.01); *G06K 9/00342* (2013.01); *A63B 60/42* (2015.10); *A63B 2071/0625* (2013.01); *A63B 2207/02* (2013.01); *A63B 2220/30* (2013.01); *A63B 2220/53* (2013.01); *A63B 2220/803* (2013.01); *A63B 2220/808* (2013.01); *A63B 2225/50* (2013.01); *G06F 1/1626* (2013.01); *G08C 2201/93* (2013.01)

(58) Field of Classification Search
CPC .................................................. A63B 24/0062
See application file for complete search history.

(56) References Cited

U.S. PATENT DOCUMENTS

| | | | |
|---|---|---|---|
| 7,602,301 | B1 | 10/2009 | Stirling et al. |
| 9,607,525 | B2 | 3/2017 | Leech et al. |
| 2010/0144456 | A1 | 6/2010 | Ahern |
| 2014/0018181 | A1 | 1/2014 | Blake et al. |

(Continued)

OTHER PUBLICATIONS

"U.S. Appl. No. 14/985,846, Corrected Notice of Allowance dated Jun. 13, 2018", 2 pgs.

(Continued)

*Primary Examiner* — Seahvosh Nikmanesh
(74) *Attorney, Agent, or Firm* — Schwegman Lundberg & Woessner, P.A.

(57) ABSTRACT

A system, device, and methods include or utilize a microphone, a processor, and a user interface. The microphone senses sound and in response outputs a sound signal indicative of the sound. The processor is coupled to the microphone to receive the sound signal, configured to analyze the sound signal to identify in the sound signal an impact of a golf club with a golf ball during a swing of the golf club and determine a characteristic of the swing of the golf club based on a portion of the sound signal corresponding to sound sensed, at least in part, before the impact. The user interface is coupled to the processor and configured to display information related to the characteristic of the swing as determined by the processor.

20 Claims, 10 Drawing Sheets

(56) References Cited

U.S. PATENT DOCUMENTS

2014/0260637 A1    9/2014  Molinari
2017/0189754 A1    7/2017  Leech
2017/0270765 A1    9/2017  Roberts et al.

OTHER PUBLICATIONS

"U.S. Appl. No. 14/985,846, Examiner Interview Summary dated Mar. 29, 2018", 3 pgs.
"U.S. Appl. No. 14/985,846, Non Final Office Action dated Nov. 17, 2017", 22 pgs.
"U.S. Appl. No. 14/985,846, Notice of Allowance dated May 31, 2018", 10 pgs.
"U.S. Appl. No. 14/985,846, Response filed Apr. 16, 2018 to Non Final Office Action dated Nov. 17, 2017", 9 pgs.
"Golf tech: Breaking the sound barrier", [Online]. Retrieved from the Internet: <URL: http://www.golfdigest.com/story/golftech-2007-09>, (Aug. 12, 2007), 7 pgs.

GOLF SWING ANALYSIS FROM PRE-STRIKE SOUND

RELATED APPLICATIONS

This application is a continuation application of U.S. patent application Ser. No. 14/985,846, filed Dec. 31, 2015, the content of which is incorporated herein by reference in its entirety.

TECHNICAL FIELD

The subject matter disclosed herein generally relates to the analysis of a golf swing using sound detected before a club strikes a ball.

BACKGROUND

Various systems analyze a golf swing for one or more characteristics of the swing. For instance, conventional optical systems utilize a camera or other imaging devices to collect visual images of the golf club during a swing and utilize sensors on the club or image recognition software to identify the club in the visual images. On the basis of the identification, the system may determine a characteristic such as a speed of the club at various times during the swing, such as by noting how far the club has moved in between image frames. The visual image may be supplemented with audio recordings of the swing to identify, for instance, a time of impact of the golf club with a golf ball to aid in focusing the analysis on the most fruitful image frames. On that basis, a speed of the swing at impact may be determined based on the speed of the club as identified from the visual image corresponding to the time of impact.

BRIEF DESCRIPTION OF THE DRAWINGS

Some embodiments are illustrated by way of example and not limitation in the figures of the accompanying drawings.

DETAILED DESCRIPTION

Example methods and systems are directed to the analysis of a golf swing using sound detected before a club strikes a ball. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Audio systems may conventionally be used in conjunction with optical systems rather than as the primary or sole mechanism by which a swing is analyzed. In fact, owing to the wide range of variables that combine to produce the sound associated with the impact, including the design and materials of the golf club, the design and materials of the golf ball, the speed of the golf club at impact, the angle of the golf club at impact, and where on the face of the golf club the impact occurs, discerning useful data from the audio recording of the impact itself may be difficult or effectively impossible outside of highly controlled environments. As such, while an audio analysis of an impact may be sufficient to determine that the impact has occurred, the audio data of the impact itself may otherwise be of little or no use in identifying a characteristic of the swing, such as a speed of the swing at impact.

However, it has been determined that by placing a microphone in a known orientation to a golf ball and sensing a sound of the swing, an analysis of the resultant sound signal of the golf swing immediately before the impact of the golf club on the golf ball may provide useful and reliable information about a characteristic of the swing. In particular, by identifying a particular time of the impact based on an analysis of the sound signal and then assessing the sound signal including at least a portion of the sound signal before the time of impact, a characteristic, such as a speed of the golf club, may be determined with suitable accuracy and reliability in many conditions to obtain useful information. Information related to the characteristic may then be presented to a user, such as by displaying the information on a user interface. Such information may further or alternatively include equipment recommendations and personal training based on changes in the characteristic over time.

Figure 1:
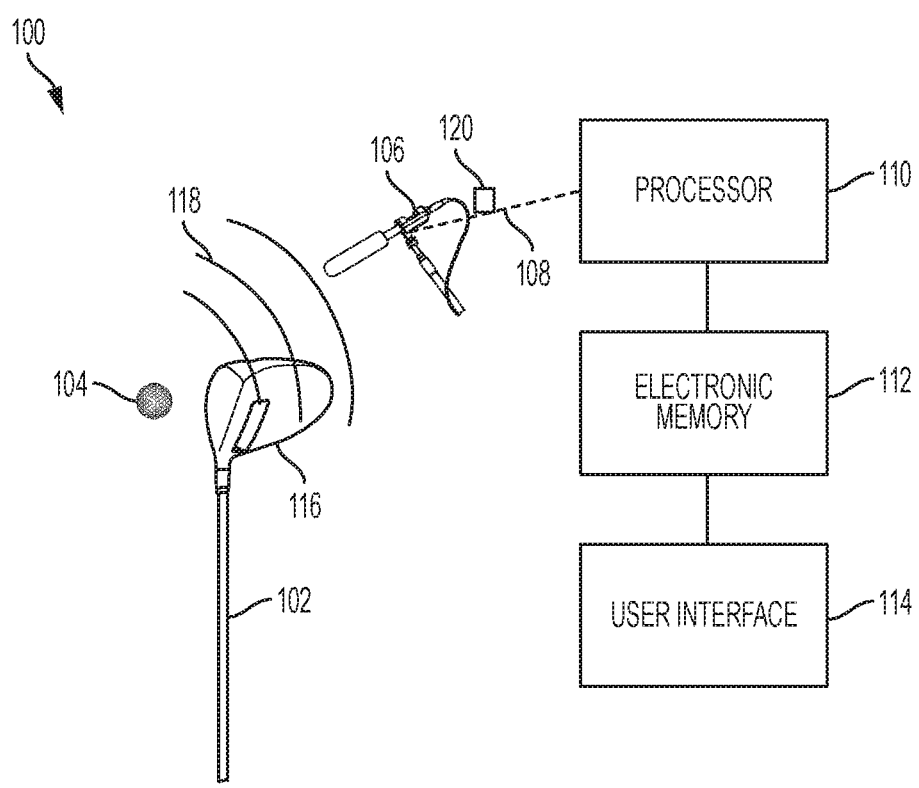
FIG. 1 is a diagram of a system configured to determine a characteristic of a golf swing based on a sound signal before an impact of golf club with a golf ball, in an example embodiment.

FIG. 1 is a diagram of a system 100 configured to determine a characteristic of a golf swing based on a sound signal before an impact of golf club 102 with a golf ball 104, in an example embodiment. The system 100 includes a microphone 106 positioned or positionable in relation to the golf ball 104. As will be disclosed herein, the microphone 106 may be positioned or positionable at a predetermined distance from, and directional orientation to the golf ball 104. The distance and orientation may vary dependent on the particular make and model of microphone 106 or device of which the microphone 106 is a component. Alternatively, the system 100 may include a mechanism to calibrate the resultant sound signal from the microphone 106, allowing the microphone 106 to be positioned within a range of distances and orientations.

In the illustrated example, the microphone 106 has a connection 108 to a processor 110, an electronic memory 112, and a user interface 114. In various examples, the connection 108 is a wired or wireless connection 108 between the microphone 106 and the processor 110, electronic memory 112, and user interface 114, which may be included in one or more devices remote from the microphone 106. In one such example, the processor 110, electronic memory 112, and user interface 114 are components of an electronic device, such as a personal computer, tablet computer, smartphone, personal digital assistant ("PDA"), and the like, and the connection 108 is a wireless connection, such as according to a Bluetooth wireless modality, WiFi, cellular, high frequency, ultra-high frequency, or other suitable wireless communication modality, technology, and/or band.

In various additional examples, the microphone 106, processor 110, electronic memory 112, and user interface 114 are components of a single electronic device which is positioned or positionable in relation to the golf ball 104. Thus, in an example illustrated herein, various components of the system 100 are included within a single smartphone which is positionable with respect to the golf ball 104. Thus, in such an example, the connection 108 is contained within the electronic device.

When a head 116 of the golf club 102 impacts the golf ball 104, a sound 118 is generated. The sound 118 propagates from the head 116 and may ultimately be sensed by the microphone 106. Upon the microphone 106 sensing the sound 118, the microphone outputs a sound signal 120 to the processor 110 via the connection 108.

Figure 2A:
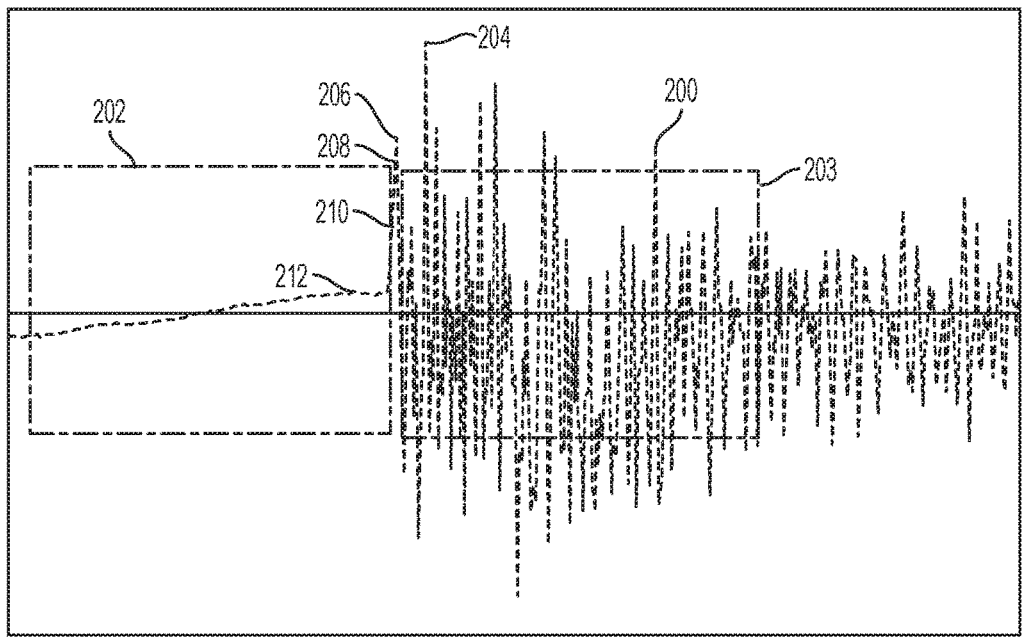
FIG. 2A illustrates a waveform of a sound signal as generated by a microphone transmitted to a processor, in an example embodiment.
Figure 2B:
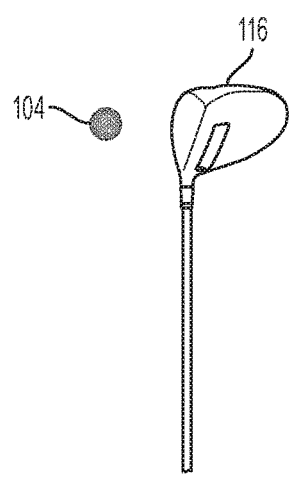
FIGS. 2B and 2C are illustrations of a head of a golf club in relation to a golf ball at various associated times covered in the waveform.
Figure 2C:
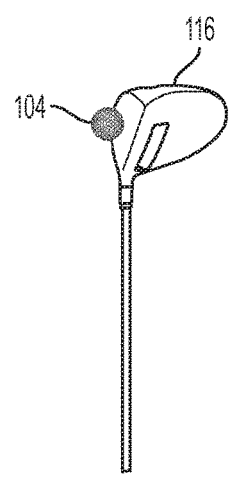

FIG. 2A illustrates a waveform 200 of the sound signal 120 as generated by the microphone 106 and transmitted to the processor 110, in an example embodiment, and FIGS. 2B and 2C are illustrations of the head 116 in relation to the ball 104 at various associated times covered in the waveform 200. In the illustrated example, the sound signal 120 is an intensity of the sound 118 in decibels (dB) as detected by the microphone 106 over time and as output by the microphone 106 as the sound signal 120. As illustrated, time corresponds to the X-axis and intensity corresponds to the Y-axis.

The waveform 200 includes a pre-impact window 202 during which the head 116 has not yet come into contact with the ball 104 and/or the amount of contact between the head 116 and the ball 104 is not sufficient to register as an impact based on the criteria for a time of impact as disclosed herein and as illustrated in FIG. 2B. Put another way, the pre-impact window 202 extends during the swing up until a time of impact of the head 116 on the ball 104. In various examples, the pre-impact window 202 is approximately 0.1 milliseconds or 0.125 milliseconds or any other suitable timeframe.

For the purposes of this description, a time of impact may not necessarily be at a first moment at which the head 116 does impact the ball 104 but rather at a time when the sound created by the impact of the head 116 with the ball 104 meets a predetermined condition for identifying the time of impact. The predetermined condition may vary based on the various processes disclosed herein. As such, precisely what qualifies as the time of impact may be consistent within various processes disclosed herein but different between different processes. Thus, while for the purposes of the particular waveform 200 the pre-impact window 202 may not be precisely definable as a general rule, it is emphasized that each process disclosed herein includes a precise definition of the pre-impact window 202 for that process that can be illustrated with particularity.

The waveform 200 further includes an impact window 203 during at least a portion of which the head 116 is in contact with the ball 104, as illustrated in FIG. 2C, sufficient to generate enough sound intensity to register as an impact. The impact window 203 begins at the time of impact. As noted above, the time of impact may vary dependent on the process described herein and is not necessarily at the instant the head 116 does in fact come into contact with the ball 104 but rather when a condition for determining or identifying the time of impact is met. The end of the impact window 203 may not be precisely defined and may, in some or all of the processes described herein, be irrelevant to such processes.

For the purposes of describing the time of impact herein, various features of the waveform 200 may be utilized within a process. An intensity peak 204 defines a highest intensity of the waveform 200. As will be disclosed herein, the intensity peak 204 may function as a trigger condition for identifying the occurrence of an impact. A first peak top 206 is a peak intensity of the waveform 200 during a first peak 208 corresponding to the impact. The first peak 208 may be identified as an earliest peak of the waveform 200 within a predetermined amount of time of the intensity peak 204 to have a slope 210, i.e., a change in intensity over time, which exceeds a threshold. In an example, the predetermined amount of time is approximately 0.125 milliseconds. A peak is any part of the waveform 200 the absolute value of which rises to a local maximum and then falls from the local maximum. The intensity peak 204 may be the first peak 208. A first peak bottom 212 is a minimum point of the first peak 208. It is noted that, for the purposes of this analysis, the absolute value of the intensity may be utilized and that a maximum intensity described herein may be understood to mean the maximum absolute value of the signal while the minimum intensity may be the intensity closest to 0 dB.

Figure 3:
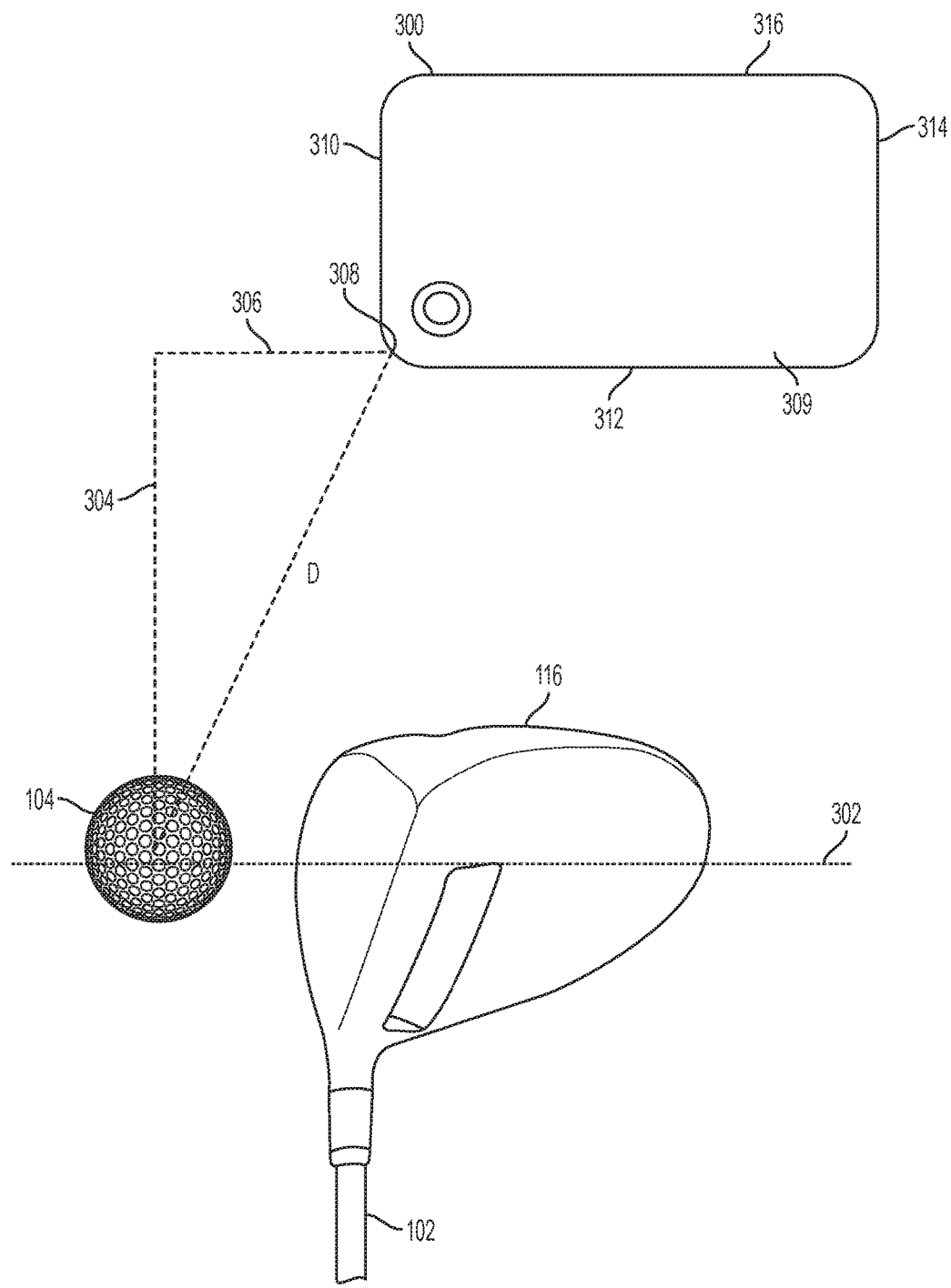
FIG. 3 is a diagram of a positional relationship between a system, implemented as a mobile device, and a golf ball, in an example embodiment.

FIG. 3 is a diagram of a positional relationship between the system 100, implemented as a mobile device 300, and the golf ball 104, in an example embodiment. As illustrated, the mobile device 300 is positioned in a predetermined orientation at a predetermined distance D from the golf ball 104 relative to a swing path 302 generally followed by the head 116 during a swinging motion of the club 102. The distance D includes a horizontal component 304 and a lateral component 306 which, in the illustrated example, generally places the mobile device 300 away from and behind the head 116 and golf ball 104 at the time of impact.

In an example, the distance D and orientation of the mobile device 300 may vary depending on the make and model of the mobile device 300, the club 102, and/or the golf ball 104. Additionally or alternatively, as will be disclosed in detail herein, the coefficients for the various processes disclosed herein may be adjusted based on the make and model of some or all of the mobile device 300, the club 102, and the golf ball 104. For the purposes of this disclosure, the distance D, the orientation of the mobile device 300, and the coefficients will be described for a Vapor Speed Driver golf club 102 by NIKE CORPORATION, an RZN Black golf ball 104 by NIKE CORPORATION, and an iPhone 6 mobile device 300 by APPLE, INC. However, it is emphasized that the distance D, the orientation, and the coefficients may be independently, empirically determined and/or individually selected for different combinations of mobile device 300, club 102, and/or golf ball 104, and that the distance D, orientation, and coefficients presented herein are for the example equipment noted above.

In the example embodiment, the distance D is approximately twenty-nine (29) centimeters from the middle of the ball 104 to a closest corner 308 of the mobile device 300. In particular, the distance D includes a horizontal component 304 of approximately twenty-five (25) centimeters and a lateral component 306 of approximately fifteen (15) centimeters. The orientation includes the mobile device 300 with a back major surface 309 facing up and a front major surface including the user interface 114 (obscured) facing down, with a top edge 310 and a left edge 312 proximate the ball 104 and a bottom edge 314 and a right edge 316 distal to the ball 104, with the edges 310, 312, 314, 316 individually generally parallel to one of the horizontal component 304 or the lateral component 306.

Figure 4:
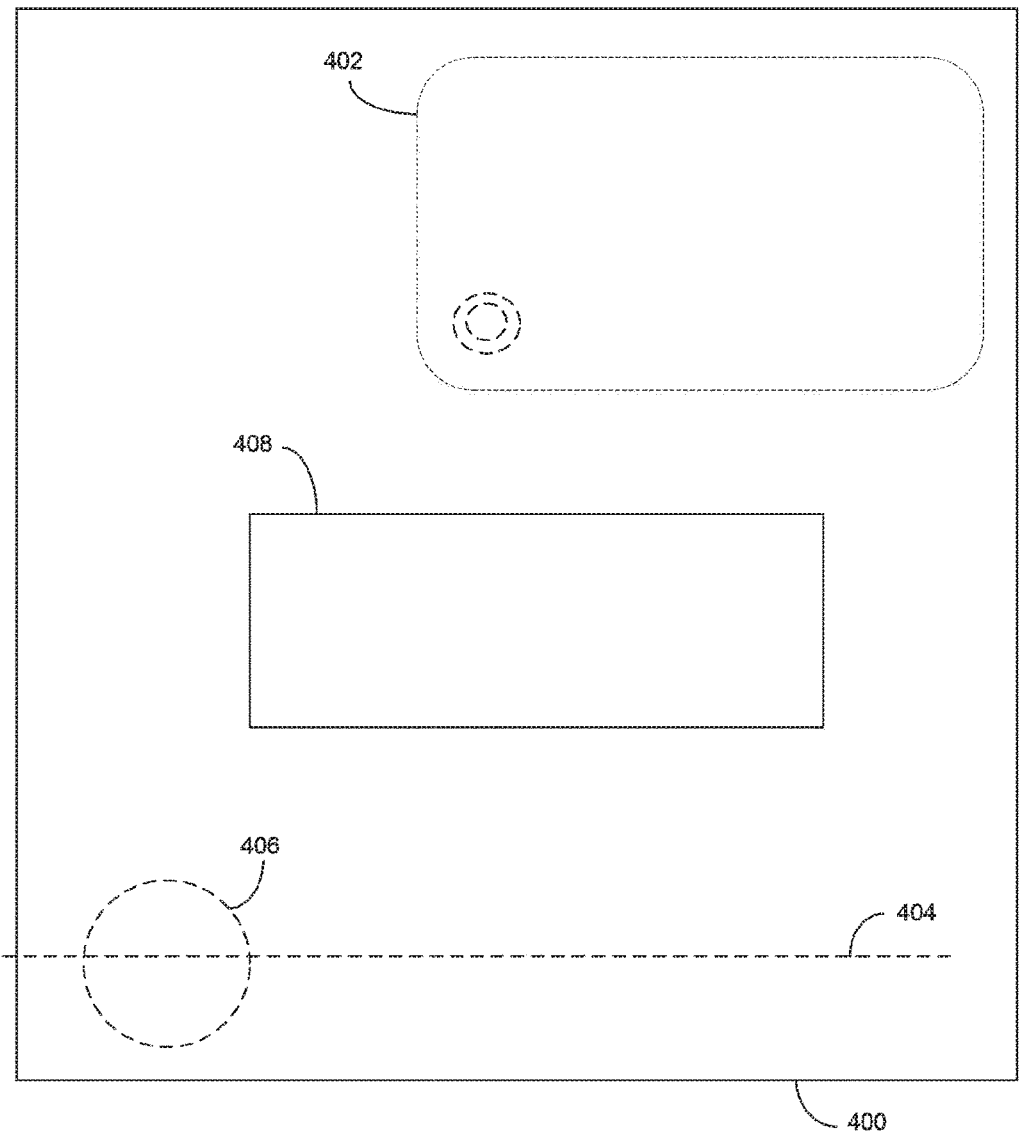
FIG. 4 is an illustration of a guide pad, in an example embodiment.

FIG. 4 is an illustration of a guide pad 400, in an example embodiment. As illustrated, the guide pad 400 is optionally included to assist in properly, positioning the mobile device 300 relative to the ball 104. The guide pad 400 includes an outline 402 of the mobile device 300, a path indication 404 corresponding to the swing path 302, and a ball marker 406 configured to seat either the ball 104 or a tee on which the ball 104 may be set in preparation for a swing. Alternatively, instead of the ball marker 406, the guide pad 400 may include instructions for where to position the ball 104 in relation to the guide pad 400, such as a predetermined distance away from the guide pad 400 along the path indication 404. The guide pad 400 further optionally includes instructions 408 for using a software application that may be loaded on the mobile device 300 to provide an analysis of the swing as disclosed herein.

Figure 5:
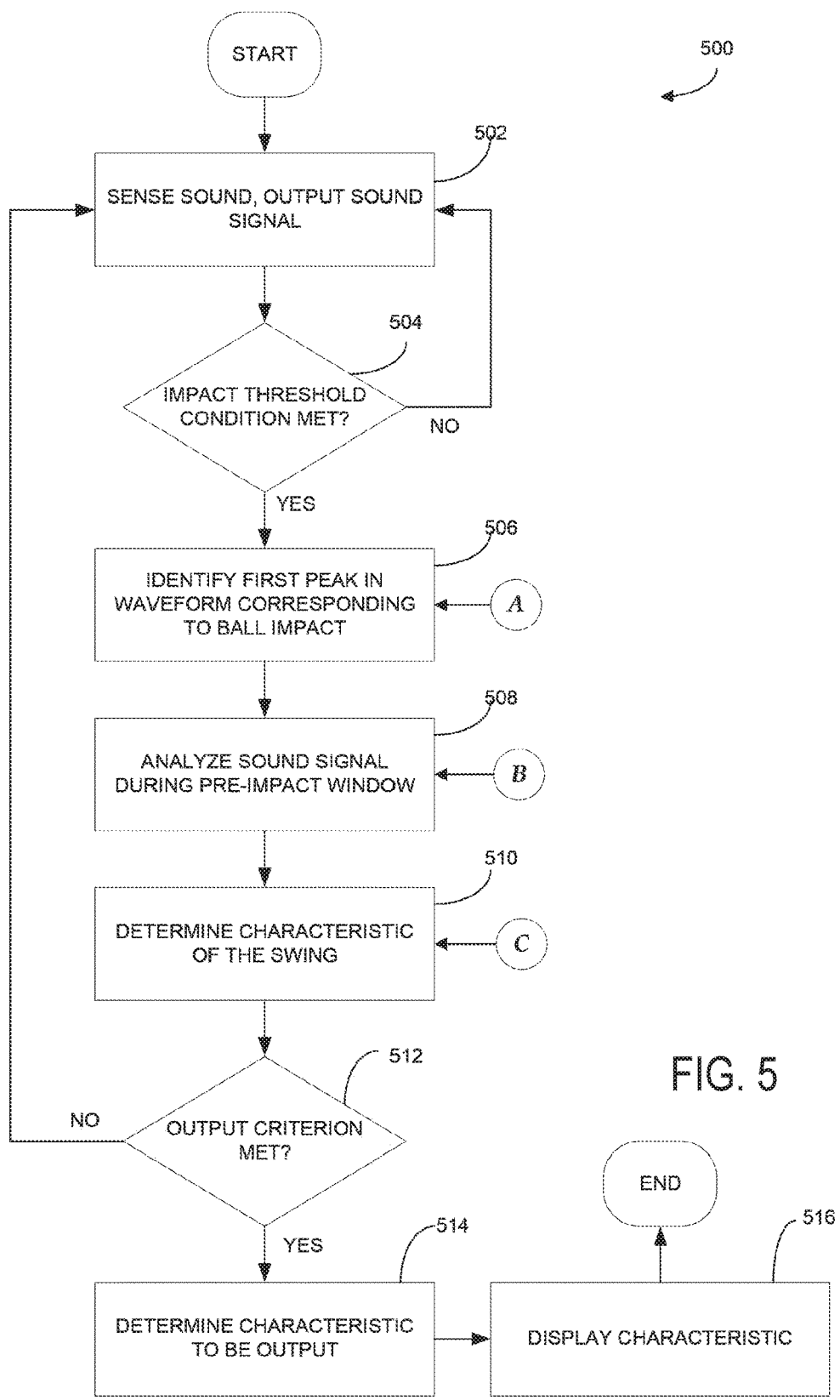
FIG. 5 is a flowchart for determining and displaying on a user interface a characteristic of a swing of a golf club, in an example embodiment.

FIG. 5 is a flowchart 500 for determining and displaying on the user interface 114 a characteristic of a swing of the golf club 102, in an example embodiment. While the flowchart 500 is described according to the various components described herein, it is noted and emphasized that the principles with respect to the flowchart 500 and other flowcharts disclosed herein may be applied to any suitable equipment and system. The flowchart 500 and ancillary flowcharts described herein may be implemented as computer code or instructions which may be stored in the electronic memory 112 or other computer readable medium and which may, when implemented on the processor 110, cause the processor 110 to perform various operations.

At 502, the microphone 106 senses sound 118 and outputs a corresponding sound signal 120, which is obtained by the processor 110. In various examples, the microphone samples the sound 118 at approximately forty-eight (48) kilohertz, though various sample rates may be applied as desired or appropriate.

At 504, the processor 110 identifies, from the sound signal 120, an impact of the golf club 102 with the golf ball 104 during a swing of the golf club 102 by analyzing the sound signal 120 to determine if a ball impact threshold condition is met by an intensity peak 204 or any other peak of the waveform 200. In an example, the ball impact threshold condition is based on an intensity threshold as assessed against the waveform 200 and the ball impact threshold condition is met by the intensity meeting, exceeding, or otherwise transcending the intensity threshold. Alternatively, the intensity peak 204 is identified and compared against the intensity threshold and, if the intensity peak 204 variously meets or exceeds the intensity threshold then the ball impact threshold condition is met. In an example, the intensity threshold is a dynamic intensity threshold that is determined based on an average intensity level of the waveform 200 over a preceding time period, such as a two (2) second rolling window, multiplied by a coefficient, such as eight thousand (8,000). Alternatively, the intensity threshold is a static intensity threshold and is based on predetermined, anticipated intensity levels from an impact.

When the intensity as measured variously, in certain examples, meets, exceeds, or otherwise transcends the intensity threshold, the ball impact threshold condition is met. It is noted, as disclosed herein, that the intensity may be considered as an absolute value and that, as such, the ball impact threshold condition may be met by the absolute value of the intensity meeting or exceeding the intensity threshold. If the ball impact threshold condition is met then the processor 110 proceeds to 506 of the flowchart 500. If not, the processor 110 returns to 502.

At 506, the processor 110 identifies the first peak 208 of the waveform 200. As disclosed herein, and as will be disclosed in further detail, the first peak 208 is an earliest peak of the waveform 200 within a predetermined amount of time of the intensity peak 204 to have a slope 210, i.e., a change in intensity amplitude over time, which exceeds a slope threshold. In an example, the predetermined amount of time is 0.125 milliseconds.

At 508, the processor 110 analyzes the sound signal 120 and corresponding waveform 200 during the pre-impact window 202. It is noted that, for the purposes of this description, the waveform 200 is simply a visualization of the sound signal 120 and that the sound signal 120 and waveform 200 may be referenced interchangeably in referring to what is utilized for the determination of various equations disclosed herein. As will be disclosed in detail herein, the analysis may determine one or more of a sound pressure level and a peak frequency amplitude during the pre-impact window 202. However, in various alternative embodiments, any of a variety of statistical or mathematical properties or relationships may be utilized that are or prove to be useful in the pre-impact analysis of a golf swing. As such, sound pressure level and peak frequency amplitude are example analyses and/or relationships and not limiting.

At 510, the processor 110 determines a characteristic of the golf swing, such as a speed of the golf club 102 and, in an example, of the club head 116, based, at least in part, on the analysis of the sound signal 120 and associated waveform 200 before the impact, as determined at 508. As will be disclosed in detail herein, the characteristic may be determined based on multiplying a result of the analysis at 508 with and/or adding the result to various coefficients which may be utilized for the combination of equipment used. In an example, the result of the analysis is multiplied by a first coefficient A, the product of which is then added to a second coefficient B, the result of which corresponds to the speed of the club head 116.

In various examples disclosed herein, multiple independent processes or analyses are utilized concurrently and combined to obtain the characteristic of the golf swing. In an example, three (3) separate processes are utilized to determine the characteristic of the golf swing, two of which are based on a sound pressure level of the sound signal 120 as measured over various pre-impact windows 202. As such, as noted herein, the pre-impact window 202 may shift depending on the nature of the process being utilized. A further such process is based on the peak frequency amplitude of the sound signal 120 and waveform 200 during another pre-impact window 202. In the example illustrated in detail herein, the three processes are averaged to obtain the characteristic for the swing corresponding to the waveform 200. However, it is emphasized that few as one or as many independent analyses as desired may be utilized.

In various examples, the three (3) separate processes include a first, a second, and a third process. In an example, the first process utilizes the sound pressure level of the sound signal 120 during a pre-impact window 202 of at least approximately five (5) milliseconds and, in various examples, up to approximately twenty (20) milliseconds and which ends at the bottom 212 of the first peak 208. In an example, the second process utilizes the sound pressure level of the sound signal 120 during a pre-impact window 202 of approximately five (5) milliseconds which ends at the top 206 of the first peak 208. In an example, the third process utilizes the peak frequency amplitude of the sound signal 120 during a pre-impact window 202 of approximately five (5) milliseconds which ends at the top 206 of the first peak 208.

It is noted that, in various examples that utilize the top 206 of the first peak 208, the intensity of the sound signal 120 between the bottom 212 and the top 206 of the first peak 208 may tend to be of greater significance than the intensity of the sound signal 120 preceding the bottom 212 of the first peak 208 owing to a much greater intensity of the sound signal 120 during the first peak 208. It is emphasized, however, that because the pre-impact window 202 includes the waveform 200 prior to any detected impact, the process nevertheless includes and is dependent on the sound signal 120 as detected before any impact of the club 102 on the ball 104.

At 512, the processor 110 optionally determines if an output criterion is met. In various examples, the processor 110 is configured to average or otherwise consider the characteristic of multiple swings and to provide information related to the characteristic across the multiple swings. For instance, the processor 110 may be configured to average the speed of two or more consecutive swings and present the average speed of the swings instead of or in addition to the speeds measured individually. As such, the output criterion may be to measure a predetermined number of swings, or a predetermined number of swings having a speed greater than a predetermined minimum speed, or any number of other output criteria, or the output criterion may be to obtain a characteristic of a single swing. If the output criterion is met, the processor 110 proceeds to 514 of the flowchart 500. If the output criterion is not met, the processor 110 returns to 502 of the flowchart 500.

At 514, the processor 110 optionally determines the characteristic, such as the speed, that is to be output to the user interface 114. In such an example, the processor 110 may, for instance, average the speeds of consecutive swings or otherwise apply a mathematical operation or determine a mathematical relationship between and among the previously determined characteristics.

At 516, the processor 110 causes the user interface 114 to display the characteristic, variously as determined at 510 or at 514. In various examples, the flowchart 500 then terminates or returns to 502 to collect additional sound data for process.

Figure 6:
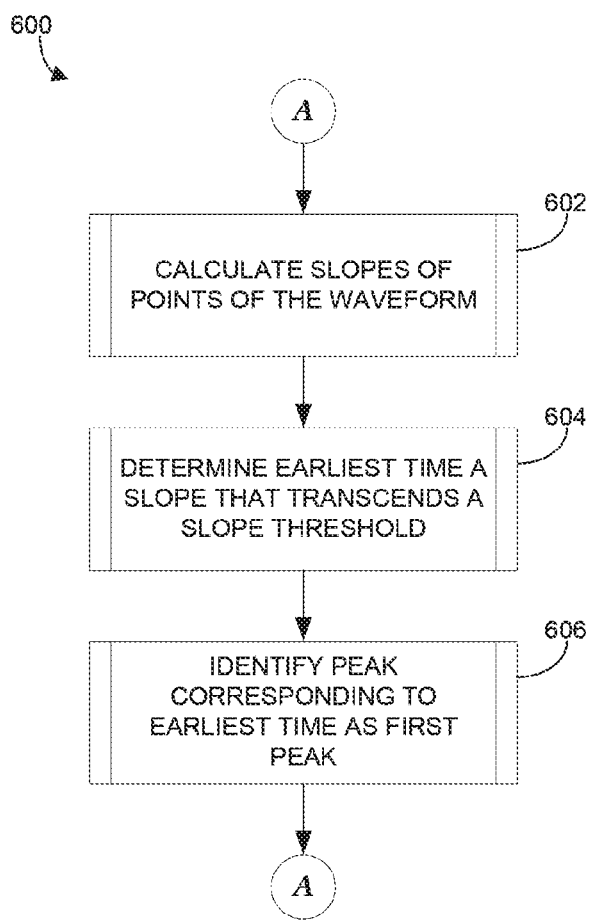
FIG. 6 is a flowchart for identifying a first peak, in an example embodiment.

FIG. 6 is a flowchart 600 for identifying the first peak 208, in an example embodiment. The flowchart 600 may function as a specific example of performing 506 of the flowchart 500, and the result of the flowchart 600 may function as the result of 506, in various example embodiments.

At 602, individual amplitude values of the intensity of the waveform 200 are utilized by the processor 110 to compute the slope or change in amplitude of the waveform 200 at various points on the waveform 200. As noted above, the example disclosed herein utilizes a sound signal 120 and resultant waveform 200 having samples obtained at forty-eight (48) kilohertz. In an example, a slope or change in amplitude is calculated by taking the absolute value of a difference in amplitude between a first sample and a second sample occurring a predetermined number of samples after the first sample. In an example, the predetermined number of samples is six (6) samples after the first sample, though in various examples the predetermined number of samples is anywhere from one (1) sample to over six (6). The slope or change in amplitude is, in various examples, determined for each of the samples that individually make up the sound signal 120 and the waveform 200.

At 604, the slopes or changes in amplitude are compared by the processor 110 against a slope threshold to identify the first slope to meet, exceed, or otherwise transcend the slope threshold, in an example, the slope threshold is eight thousand (8,000). The earliest time of a slope meeting the slope threshold corresponds to the time of the first sample of the pair of samples that were utilized to determine the slope.

At 606, the first peak 208 is identified by the processor 110 as being the peak of which the first sample of the slope which met the slope threshold is a part.

Figure 7:
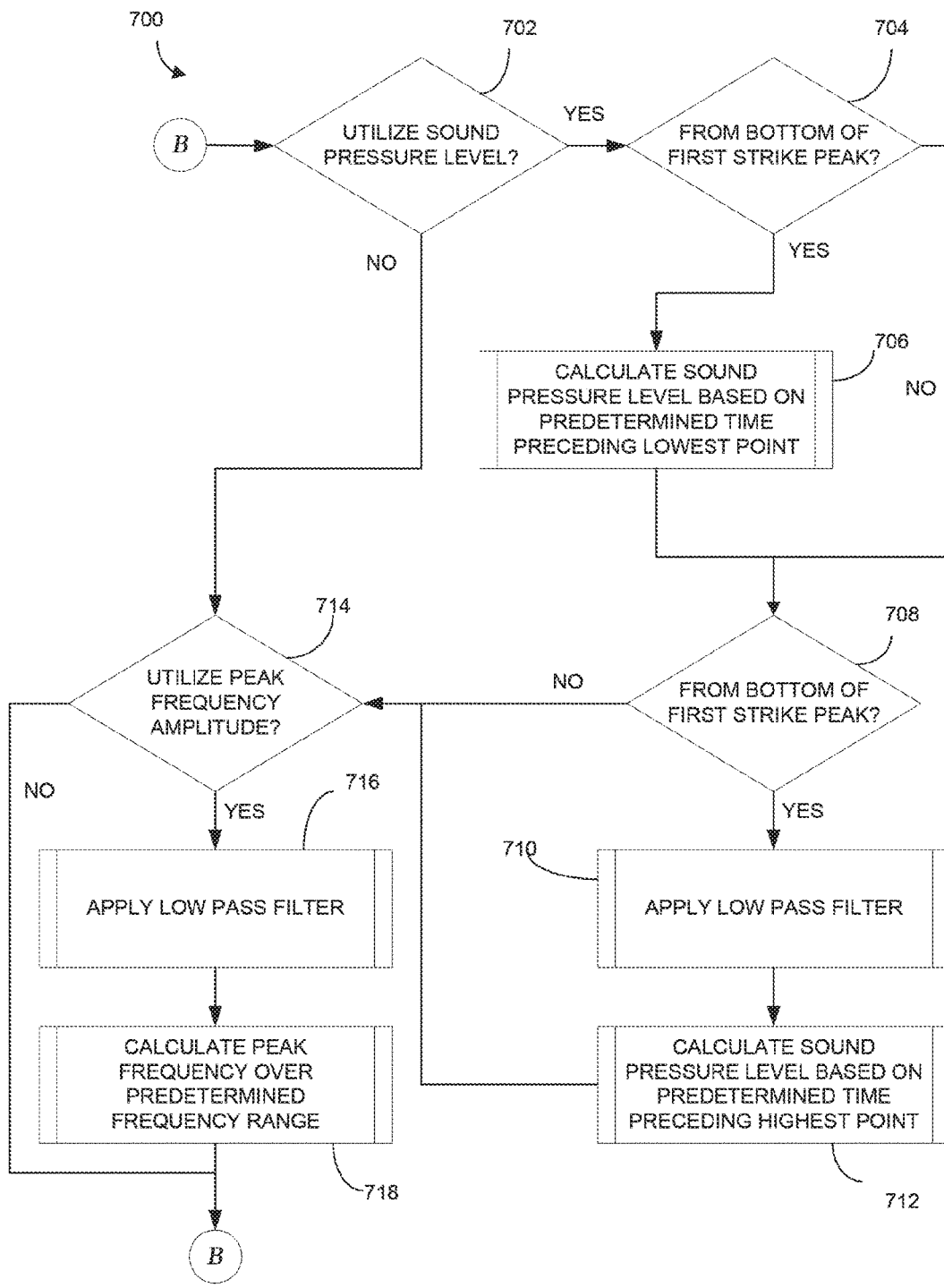
FIG. 7 is a flowchart for analyzing a sound signal and waveform during a pre-impact window, in an example embodiment.

FIG. 7 is a flowchart 700 for analyzing the sound signal 120 and waveform 200 during the pre-impact window 202, in an example embodiment. The flowchart 700 may function as a specific example of performing 508 of the flowchart 500 and the result of the flowchart 700 may function as the result of 508, in various example embodiments.

At 702, the processor 110 determines if a sound pressure level of the sound signal 120 will be utilized in determining the characteristic of the swing. In particular, if the processor 110 is programmed to utilize either the first or the second processes disclosed above then the processor 110 proceeds to 704. If not, the processor proceeds to 714.

At 704, if the processor 110 will utilize the first process disclosed herein, the processor 110 proceeds to 706. If not, the processor 110 proceeds to 708.

At 706, the processor 110 calculates the sound pressure level of the sound signal 120 and waveform 200 for the first process. As noted above, the first process is, in various examples, based on a pre-impact window 202 of at least five (5) milliseconds and up to twenty (20) milliseconds extending up to the bottom 212 of the first peak 208. For the first process, the sound signal 120 is not filtered for the purposes of calculating the sound pressure level.

The sound pressure level may be computed according to any of a variety of methodologies known in the art. In an example, the processor 110 determines the sound pressure level based on the equation:

$$\text{Sound pressure level} = 10 * \log_{10}\left(\frac{P_1}{P_0}\right)$$

where $P_1$ is the average intensity of the sound signal 120 during the pre-impact window 202 and $P_0$ is the average intensity of the sound signal 120 prior to the pre-impact window 202.

At 708, if the processor 110 will utilize the second process disclosed herein, the processor 110 proceeds to 710. If not, the processor 110 proceeds to 714.

At 710, the processor 110 applies a filter to the sound signal 120 and waveform 200 over the pre-impact window 202 extending approximately five (5) milliseconds ending at the first peak top 206. In an example, the filter is a five hundred (500) Hertz low pass filter.

At 712, the processor 110 determines the sound pressure level based on the equation presented above, where $P_1$ is the average intensity of the sound signal 120 during the pre-impact window 202 as filtered at 710.

At 714, if the processor 110 will utilize the third process as disclosed herein, the processor 110 proceeds to 716. If not, the processor 110 proceeds ends the flowchart 700.

At 716, the processor 110 applies a filter to the sound signal 120 and waveform 200 over the pre-impact window 202 extending approximately five (5) milliseconds ending at the first peak top 206. In an example, the filter is a five hundred (500) Hertz low pass filter.

At 718, the processor 110 calculates the peak frequency amplitude of the waveform 200, as filtered at 716, during the pre-impact window 202. The processor 110 may utilize any methodology for calculating the peak frequency amplitude known in the art. In an example, the processor 110 performs a Fourier transform of the waveform 200, as filtered at 716, during the pre-impact window 202 and identifies a peak frequency of the resultant transform. The processor 110 then ends the flowchart 700.

Figure 8:
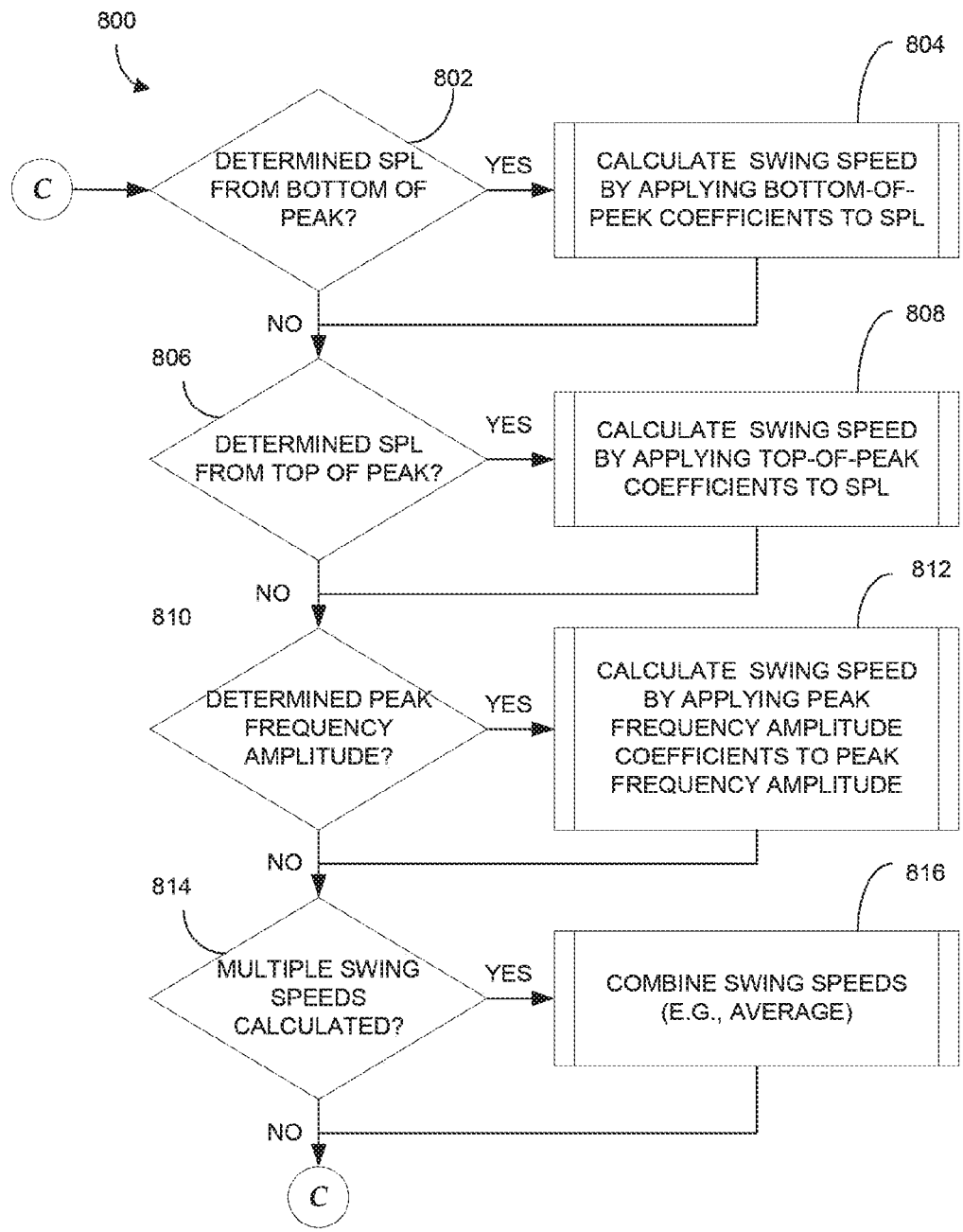
FIG. 8 is a flowchart for calculating a characteristic of a golf swing, such as the swing speed of the golf club, during a pre-impact window, in an example embodiment.

FIG. 8 is a flowchart 800 for calculating a characteristic of a golf swing, such as the swing speed of the golf club 102, during the pre-impact window 202, in an example embodiment. The flowchart 800 may function as a specific example of performing 510 of the flowchart 500 and the result of the flowchart 800 may function as the result of 510, in various example embodiments.

At 802, if the processor 110 is implementing the first process and/or has determined the sound pressure level with the pre-impact window 202 ending at the first peak bottom 212, then the processor proceeds to 804. If not, the processor proceeds to 806.

At 804, the processor 110 calculates the swing characteristic by applying coefficients to the sound pressure level as determined with the pre-impact window 202 ending at the first peak bottom 212. In particular, in an example, the processor 110 calculates the swing speed according to $$\text{Swing speed}_1 = A_1 * X + B_1$$

where X is the sound pressure level, $A_1$ is a first coefficient of 2.6051 and $B_1$ is a second coefficient of −93.29. In such an example, the swing speed is determined in miles per hour. In various examples, these coefficients are applicable in an indoor setting or in a setting that is relatively more controlled than on a golf course. In an example, where the swing speed is being determined in an outdoor setting, the coefficients may be $A_1$ of 2.0447 and $B_1$ of −53.837. In various examples, such coefficients may produce an indoor $r^2$ of approximately 0.92 and an outdoor $r^2$ of approximately 0.65.

At 806, if the processor 110 is implementing the second process and/or has determined the sound pressure level with the pre-impact window 202 ending at the first peak top 206, then the processor proceeds to 808. If not, the processor proceeds to 810.

At 808, the processor 110 calculates the swing characteristic by applying coefficients to the sound pressure level as determined with the pre-impact window 202 ending at the first peak top 206 and as filtered, as disclosed herein. In particular, in an example, the processor 110 calculates the swing speed according to $$\text{Swing speed}_2 = A_2 X + B_2$$

where X is the sound pressure level, $A_2$ is a first coefficient of 2.8681 and $B_2$ is a second coefficient of 123.37. In such an example, the swing speed is determined in miles per hour. In various examples, these coefficients are applicable in an indoor setting or in a setting that is relatively more controlled than on a golf course. In an example, where the swing speed is being determined in an outdoor setting, the coefficients may be $A_2$ of 2.1406 and $B_2$ of 114.58. In various examples, such coefficients may produce an indoor $r^2$ of approximately 0.9 and an outdoor $r^2$ of approximately 0.65.

At 810, if the processor 110 is implementing the third process and/or has determined the peak frequency amplitude with the pre-impact window 202 ending at the first peak top 206, then the processor proceeds to 812. If not, the processor proceeds to 814.

At 812, the processor 110 calculates the swing characteristic by applying coefficients to the peak frequency amplitude as determined with the pre-impact window 202 ending at the first peak top 206 and as filtered, as disclosed herein. In particular, in an example, the processor 110 calculates the swing speed according to $$\text{Swing speed}_3 = A_3 * X + B_3$$

where X is the peak frequency amplitude, $A_3$ is a first coefficient of 1.9812 and $B_3$ is a second coefficient of −30.539. In such an example, the swing speed is determined in miles per hour. In various examples, these coefficients are applicable in an indoor setting or in a setting that is relatively more control led than on a golf course. In an example, where the swing speed is being determined in an outdoor setting, the coefficients may be $A_3$ of 1.3334 and $B_3$ of 11.525. In various examples, such coefficients may produce an indoor $r^2$ of approximately 0.88 and an outdoor $r^2$ of approximately 0.52.

At 814, if the processor 110 has calculated multiple swing speeds above, the processor 110 proceeds to 816. If not, the processor 110 ends the flowchart 800.

At 816, the processor 110 combines each of the individually-determined swing speeds determined according to the various processes into an aggregated swing speed. In an example, the processor 110 averages the swing speeds to generate the aggregated swing speed.

Figure 9:
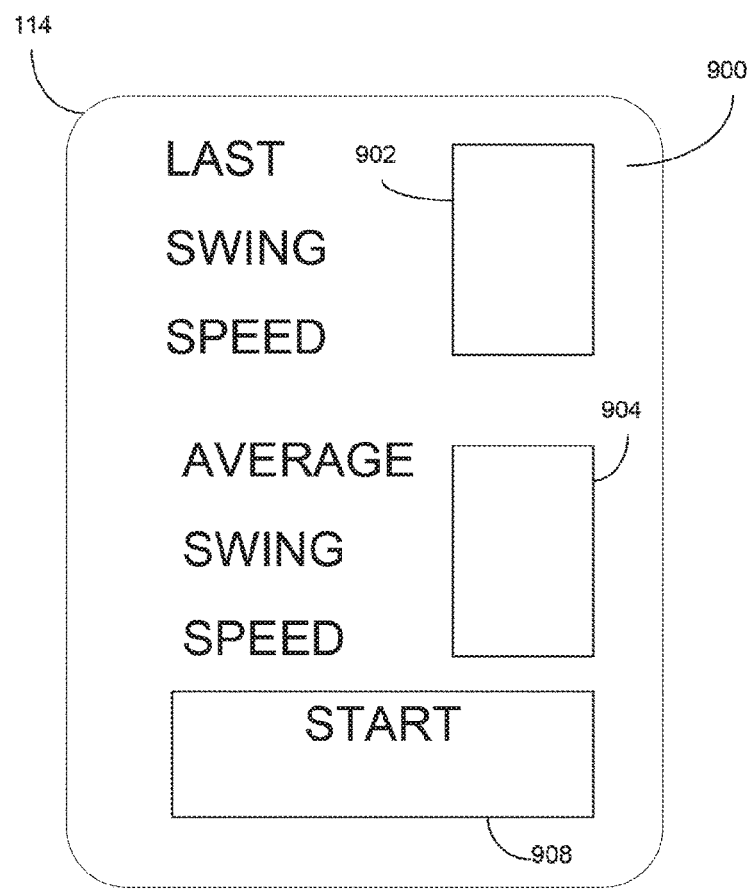
FIG. 9 is a depiction of the user interface displaying information related to a characteristic of a swing, in an example embodiment.

FIG. 9 is a depiction of the user interface 114 displaying information related to the characteristic of the swing, in an example embodiment. In the illustrated example, the user interface 114 includes a display 900 of the mobile device 300, though it is noted and emphasized that displays other than that of the mobile device 300 may be implemented.

As illustrated, the display 900 includes a preceding swing speed field 902 of an immediately preceding swing and a rolling average swing speed field 904 of a preceding n number of swings. In an example, the user interface 114 further includes a user input element, such as a touchscreen. In such an example, the display 900 is configured to further display a button 908 or other input mechanism to allow a user to cause the mobile device 300 to detect sound for analysis as well as to enter additional information, such as the number n of swings which make up the rolling average.

Figure 10:
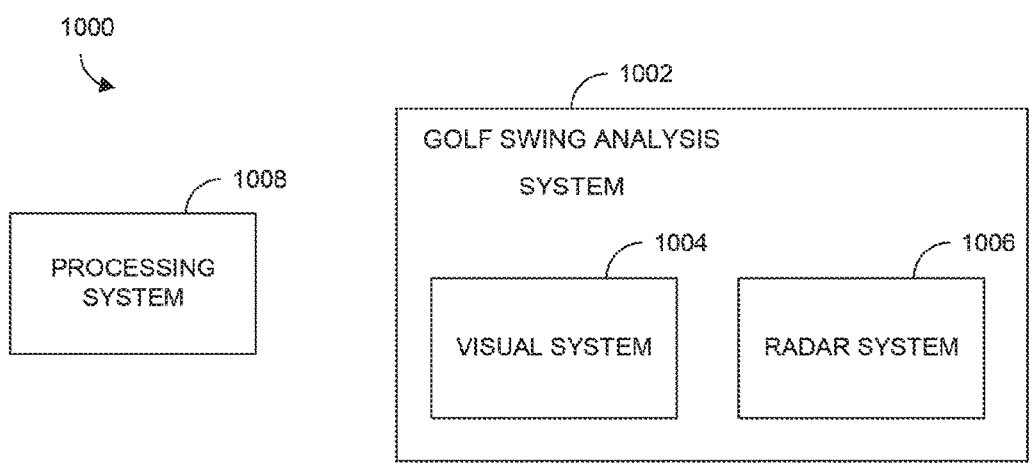
FIG. 10 is a block diagram of an equipment characterization system configured to obtain coefficients for combinations of a golf club, a microphone and/or associated mobile device, and/or a golf ball, in an example embodiment.

FIG. 10 is an equipment characterization system 1000 configured to obtain coefficients for combinations of a golf club 102, a microphone 106 and/or associated mobile device 300, and/or a golf ball 104, in an example embodiment. The coefficients may then serve as a basis for obtaining a characteristic of a golf swing as disclosed herein. In an example, the characterization system 1000 is configured to allow a person or machine to swing a golf club 102, determine a characteristic of the swing, such as swing speed, using one or more processes, compare the swing characteristic against sound data obtained from the same swing, and determine coefficients that would, if applied per the processes disclosed herein, produce a suitably accurate determination of the characteristic based on sound data.

The characterization system 1000 includes a golf swing analysis system 1002. In the illustrated example, the golf swing analysis system 1002 is or includes a visual golf swing analysis system 1004, including a camera and related equipment configured to take images of a golf swing and obtain characteristics of the swing, such as a speed of the club 102. In an example, a Phantom v2011 high-speed camera by VISION RESEARCH, INC., is configured and positioned to obtain high-speed images of the golf club 102 as the head 116 impacts the ball 104. The high-speed camera is coupled to a video analysis system to analyze the high-speed images to determine the speed of the head 116 at impact.

In an example, the golf swing analysis system 1002 further includes a radar golf swing analysis system 1006. In an example, the radar golf swing analysis system 1006 is a Swing Speed Radar by SPORTS SENSORS, INC. The radar golf swing analysis system 1006 is configured and positioned to obtain a radar return from the club 102 and head 116 as the head 116 impacts the ball 104. On the basis of the radar return, the radar golf swing analysis system 1006 outputs a speed of the club 102 and/or head 116 as the head 116 impacts the ball 104.

The golf swing analysis system 1002 may be utilized where the speed of the swing is not known, e.g., where a person is swinging the club 102. Additionally or alternatively, a swinging machine may be utilized that reliably produces a swing of a particular speed on command. As such a machine may produce a known output, the use of the golf swing analysis system 1002 may be to verify a known speed or the golf swing analysis system 1002 may be superfluous and not utilized.

The characterization system 1000 is configured to position the microphone 106 in the suitable location and orientation, as disclosed herein. The characterization system 1000 is configured to obtain a sufficient sample set of swings as analyzed by the golf swing analysis system 1002 cross-referenced against sound signals 120 output by the microphone 106. A processing system 1008, such as a personal computer or other conventional computing device, may be configured to compare the sound signals 120 against the known speed of the club 102 and/or head 116 to determine coefficients that produce reliable and accurate determined speeds based on the sound signals 120.

In an example, for a particular combination of equipment, e.g., a particular club 102 and particular ball 104, the characterization system 1000 collects results for multiple swings in which the actual swing speed is either known or determined according to the various processes disclosed herein. In various examples, the microphone 106, being in the predetermined orientation to the ball 104, collects amplitude data for the various swings. In an example, the coefficients for a process may be determined by plotting the measured amplitude of the sound of the pre-impact window 202 for the process on the x-axis of a graph and the known speed on the y-axis of the graph and a best-fit line determined to fit the various data points. The best-fit line may have a slope A and a y-axis crossing point B as the coefficients for that process. The process may be repeated or may be recomputed for each process.

Figure 11:
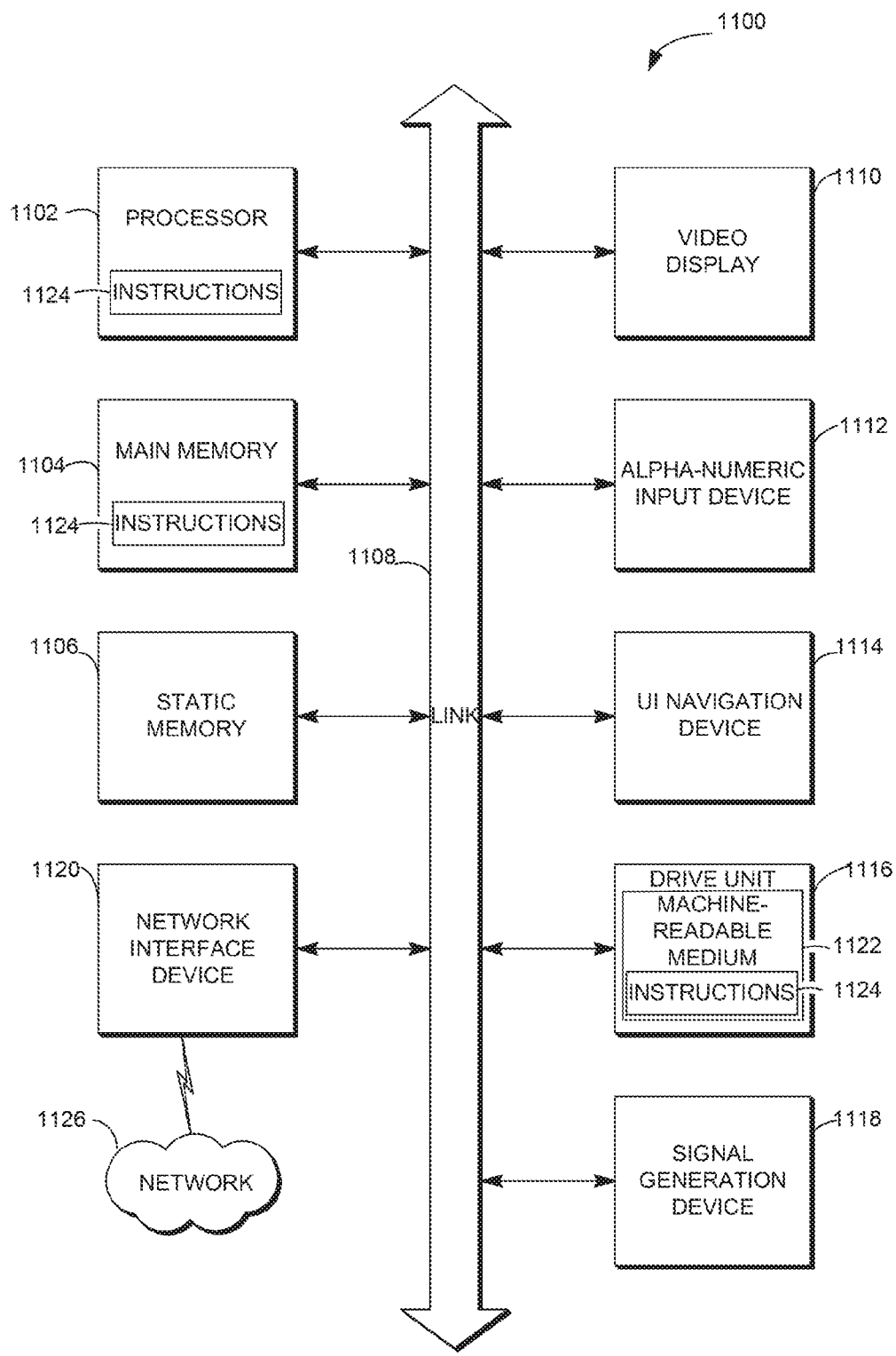
FIG. 11 is a block diagram illustrating components of a machine, according to some example embodiments, able to read instructions from a machine-readable medium.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, the machine 1100 may implement the system 100 and/or mobile device 300 and the features included and described therein. The machine 1100 thus describes specific hardware configurations on which the system 100 and/or mobile device 300 may be implemented and provided to users of the system 100 and/or mobile device 300.

FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a stand-alone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112. (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker); and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

EXAMPLES

In Example 1, a system includes a microphone, a processor, and a user interface. The microphone senses sound and in response outputs a sound signal indicative of the sound. The processor is coupled to the microphone to receive the sound signal, configured to analyze the sound signal to identify in the sound signal an impact of a golf club with a golf ball during a swing of the golf club and determine a characteristic of the swing of the golf club based on a portion of the sound signal corresponding to sound sensed, at least in part, before the impact. The user interface is coupled to the processor and configured to display information related to the characteristic of the swing as determined by the processor.

In Example 2, the system of Example 1 optionally further includes that the sound signal includes an intensity of the sound over time and wherein the processor is further configured to identify a time of impact based on a local minimum of the intensity that corresponds to a rate of change of the intensity transcending a threshold and determine the characteristic of the swing from the portion of the sound signal corresponding to a predetermined time period ending at the time of impact.

In Example 3, the system of any one or more of Examples 1 and 2 optionally further includes that the processor is further configured to determine the characteristic of the swing based on a sound pressure level of the portion of the sound signal during the predetermined time period.

In Example 4, the system of any one or more of Examples 1-3 optionally further includes that the sound signal includes an intensity of the sound over time and that the processor is further configured to identify a time of impact based on a local maximum of the intensity that corresponds to a rate of change of the intensity transcending a threshold and determine the characteristic of the swing from the sound signal corresponding to a predetermined time period ending at the time of impact.

In Example 5, the system of any one or more of Examples 1-4 optionally further includes that the processor is further configured to determine the characteristic of the swing based on a sound pressure level of the sound signal, as filtered through a low pass filter having a cutoff of approximately 500 Hertz, during the predetermined time period.

In Example 6, the system of any one or more of Examples 1-5 optionally further includes that the processor is further configured to determine the characteristic of the swing based on a peak frequency amplitude of the sound signal as filtered through a low pass filter having a cutoff of approximately 500 Hertz, during the predetermined time period.

In Example 7, the system of any one or more of Examples 1-6 optionally further includes a mobile electronic device, wherein the microphone, the processor, and the user interface are components of the mobile electronic device.

In Example 8, the system of any one or more of Examples 1-7 optionally further includes that the processor, in determining the characteristic of the golf club swing, determines a speed of at least a head of the golf club before the impact.

In Example 9, a computer readable medium includes instructions which, when implemented on a processor, cause the processor to perform operations comprising identify, in a sound signal obtained from a microphone, an impact of a golf club with a golf ball during a swing of the golf club, determine a characteristic of the swing of the golf club based on a portion of the sound signal corresponding to sound sensed, at least in part, before the impact, and cause a user interface to display information related to the characteristic of the swing as determined by the processor.

In Example 10, the computer readable medium of Example 9 optionally further includes that the sound signal includes an intensity of the sound over time and further includes instructions which cause the processor to identify a time of impact based on a local minimum of the intensity that corresponds to a rate of change of the intensity transcending a threshold and determine the characteristic of the portion of the swing from the sound signal corresponding to a predetermined time period ending at the time of impact.

Example 11, the computer readable medium of any one or more of Examples 9 and 10 optionally further includes instructions which cause the processor to determine the characteristic of the swing based on a sound pressure level of the portion of the sound signal during the predetermined time period.

In Example 12, the computer readable medium of any one or more of Examples 9-11 optionally further includes that the sound signal includes an intensity of the of the sound over time and further comprising instructions which cause the processor to identify a time of impact based on a local maximum of the intensity that corresponds to a rate of change of the intensity transcending a threshold and determine the characteristic of the swing from the sound signal corresponding to a predetermined time period ending at the time of impact.

In Example 13, the computer readable medium of any one or more of Examples 9-12 optionally further includes instructions which cause the processor to determine the characteristic of the swing based on a sound pressure level of the sound signal, as filtered through a low pass filter having a cutoff frequency of approximately 500 Hertz, during the predetermined time period.

In Example 14, the computer readable medium of any one or more of Examples 9-13 optionally further includes instructions which cause the processor to determine the characteristic of the swing based on a peak frequency amplitude of the sound signal, as filtered through a low pass filter having a cutoff of approximately 500 Hertz, during the predetermined time period.

In Example 15, the computer readable medium of any one or more of Examples 9-14 optionally further includes that the characteristic is a speed of at least a head of the golf club before the impact.

In Example 16, a method includes receiving, from a microphone, sound signal based on the sound sensed by the microphone, identifying, using one or more processors, in the sound signal obtained from a microphone, an impact of a golf club with a golf ball during a swing of the golf club, determining, using the one or more processors, a characteristic of the swing of the golf club based on a portion of the sound signal corresponding to sound sensed, at least in part, before the impact, and generating, using the one or more processors, a user interface to display information related to the characteristic of the swing as determined by the processor.

In Example 17, the method of Example 16 optionally further includes that the sound signal includes an intensity of the sound over time and further comprises identifying, with the processor, a time of impact based on a local minimum of the intensity that corresponds to a rate of change of the intensity transcending a threshold and determining, with the processor, the characteristic of the swing from the portion of the sound signal corresponding to a predetermined time period ending at the time of impact.

In Example 18, the method of any one or more of Examples 16 and 17 optionally further includes determining, with the processor, the characteristic of the swing based on a sound pressure level of the portion of the sound signal during the predetermined time period.

In Example 19, the method of any one or more of Examples 16-18 optionally further includes that the sound signal includes an intensity of the sound over time and further comprises identifying, with the processor a time of impact based on a local maximum of the intensity that corresponds to a rate of change of the intensity transcending a threshold and determining, with the processor, the characteristic of the swing from the sound signal corresponding to a predetermined time period ending at the time of impact.

In Example 20, the method of any one or more of Examples 16-19 optionally further includes that the characteristic is a speed of at least a head of the golf club before the impact.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
   a microphone that senses sound and in response outputs a sound signal indicative of the sound;
   a processor, coupled to the microphone to receive the sound signal, configured to analyze the sound signal to:
   identify in the sound signal an impact of a golf club with a golf ball during a swing of the golf club; and
   determine a characteristic of the swing of the golf club based on a portion of the sound signal corresponding to sound sensed, at least in part, before the impact; and
   a user interface, coupled to the processor, configured to display information related to the characteristic of the swing as determined by the processor.

2. The system of claim 1, wherein the sound signal includes an intensity of the sound over time and wherein the processor is further configured to:
   identify a time of impact based on a local minimum of the intensity that corresponds to a rate of change of the intensity transcending a threshold; and
   determine the characteristic of the swing from the portion of the sound signal corresponding to a predetermined time period ending at the time of impact.

3. The system of claim 2, wherein the processor is further configured to determine the characteristic of the swing based on a sound pressure level of the portion of the sound signal during the predetermined time period.

4. The system of claim 1, wherein the sound signal includes an intensity of the sound over time and wherein the processor is further configured to:
   identify a time of impact based on a local maximum of the intensity that corresponds to a rate of change of the intensity transcending a threshold; and
   determine the characteristic of the swing from the sound signal corresponding to a predetermined time period ending at the time of impact.

5. The system of claim 4, wherein the processor is further configured to determine the characteristic of the swing based on a sound pressure level of the sound signal, as filtered through a low pass filter having a cutoff of approximately 500 Hertz, during the predetermined time period.

6. The system of claim 4, wherein the processor is further configured to determine the characteristic of the swing based on a peak frequency amplitude of the sound signal as filtered through a low pass filter having a cutoff of approximately 500 Hertz, during the predetermined time period.

7. The system of claim 1, further comprising a mobile electronic device, wherein the microphone, the processor, and the user interface are components of the mobile electronic device.

8. The system of claim 1, wherein the processor, in determining the characteristic of the golf club swing, determines a speed of at least a head of the golf club before the impact.

9. A non-transitory computer readable medium, comprising instructions which, when implemented on a processor, cause the processor to perform operations comprising:
   identify, in a sound signal obtained from a microphone, an impact of a golf club with a golf ball during a swing of the golf club;
   determine a characteristic of the swing of the golf club based on a portion of the sound signal corresponding to sound sensed, at least in part, before the impact; and
   cause a user interface to display information related to the characteristic of the swing as determined by the processor.

10. The non-transitory computer readable medium of claim 9, wherein the sound signal includes an intensity of the sound over time and further comprising instructions which cause the processor to:
    identify a time of impact based on a local minimum of the intensity that corresponds to a rate of change of the intensity transcending a threshold; and
    determine the characteristic of the portion of the swing from the sound signal corresponding to a predetermined time period ending at the time of impact.

11. The non-transitory computer readable medium of claim 10, further comprising instructions which cause the processor to determine the characteristic of the swing based on a sound pressure level of the portion of the sound signal during the predetermined time period.

12. The non-transitory computer readable medium of claim 9, wherein the sound signal includes an intensity of the sound over time and further comprising instructions which cause the processor to:
identify a time of impact based on a local maximum of the intensity that corresponds to a rate of change of the intensity transcending a threshold; and
determine the characteristic of the swing from the sound signal corresponding to a predetermined time period ending at the time of impact.

13. The non-transitory computer readable medium of claim 12, further comprising instructions which cause the processor to determine the characteristic of the swing based on a sound pressure level of the sound signal, as filtered through a low pass filter having a cutoff frequency of approximately 500 Hertz, during the predetermined time period.

14. The non-transitory computer readable medium of claim 12, further comprising instructions which cause the processor to determine the characteristic of the swing based on a peak frequency amplitude of the sound signal, as filtered through a low pass filter having a cutoff of approximately 500 Hertz, during the predetermined time period.

15. The non-transitory computer readable medium of claim 9, wherein the characteristic is a speed of at least a head of the golf club before the impact.

16. A method, comprising:
receiving, from a microphone, sound signal based on the sound sensed by the microphone;
identifying, using one or more processors, in the sound signal obtained from a microphone, an impact of a golf club with a golf ball during a swing of the golf club;
determining, using the one or more processors, a characteristic of the swing of the golf club based on a portion of the sound signal corresponding to sound sensed, at least in part, before the impact; and
generating, using the one or more processors, a user interface to display information related to the characteristic of the swing as determined by the processor.

17. The method of claim 16, wherein the sound signal includes an intensity of the sound over time and further comprising:
identifying, with the processor, a time of impact based on a local minimum of the intensity that corresponds to a rate of change of the intensity transcending a threshold; and
determining, with the processor, the characteristic of the swing from the portion of the sound signal corresponding to a predetermined time period ending at the time of impact.

18. The method of claim 17, further comprising determining, with the processor, the characteristic of the swing based on a sound pressure level of the portion of the sound signal during the predetermined time period.

19. The method of claim 16, wherein the sound signal includes an intensity of the sound over time and further comprising:
identifying, with the processor a time of impact based on a local maximum of the intensity that corresponds to a rate of change of the intensity transcending a threshold; and
determining, with the processor, the characteristic of the swing from the sound signal corresponding to a predetermined time period ending at the time of impact.

20. The method of claim 16, wherein the characteristic is a speed of at least a head of the golf club before the impact.

* * * * *